United States Patent [19]

Polich et al.

[11] Patent Number: 5,090,014
[45] Date of Patent: Feb. 18, 1992

[54] IDENTIFYING LIKELY FAILURE POINTS IN A DIGITAL DATA PROCESSING SYSTEM

[75] Inventors: Herman Polich, Monument; James Nicholson; Larry Emlich, both of Colorado Springs, all of Colo.

[73] Assignee: Digital Equipment Corporation, Maynard, Mass.

[21] Appl. No.: 430,168

[22] Filed: Nov. 1, 1989

Related U.S. Application Data

[63] Continuation of Ser. No. 175,485, Mar. 30, 1988.

[51] Int. Cl.[5] .............................................. G06F 11/00
[52] U.S. Cl. .................................. 371/15.1; 371/16.1; 371/29.1; 371/16.5
[58] Field of Search ................. 371/4, 11.1, 11.2, 11.3, 371/29.1, 16.5, 15.1, 5.5, 5.1, 8.1, 8.2, 9.1, 10.1, 7, 14; 364/513, 200

[56] References Cited

U.S. PATENT DOCUMENTS

| | | | |
|---|---|---|---|
| 3,704,363 | 11/1972 | Salmassy | 371/5.1 |
| 3,815,097 | 6/1974 | Gardner et al. | 340/172.5 |
| 3,928,830 | 12/1975 | Bellamy | 371/4 |
| 4,188,615 | 2/1980 | Tan | 371/4 |
| 4,242,751 | 12/1980 | Henckels | 371/29.1 X |
| 4,453,210 | 6/1984 | Suzuki | 371/4 X |
| 4,633,467 | 12/1986 | Abel | 371/16.5 |
| 4,644,479 | 2/1987 | Kemper et al. | 364/492 |
| 4,710,924 | 12/1987 | Chum | 371/4 |
| 4,713,810 | 12/1987 | Chum | 371/4 |
| 4,740,887 | 4/1988 | Rutenberg | 371/11.3 X |
| 4,754,409 | 6/1988 | Ashford et al. | 364/513 |
| 4,769,761 | 9/1988 | Downes | 371/4 X |
| 4,817,092 | 3/1989 | Denny | 371/11.3 |
| 4,841,456 | 6/1989 | Hogan | 364/550 |
| 4,847,795 | 7/1989 | Baker et al. | 364/579 |
| 4,866,712 | 9/1989 | Chao | 371/5.5 X |
| 4,922,491 | 5/1990 | Coale | 371/29.1 X |
| 4,932,028 | 6/1990 | Katircioglu | 371/29.1 X |

FOREIGN PATENT DOCUMENTS 57-109061 7/1982 Japan.
WO87/06371 10/1987 PCT Int'l Appl.

OTHER PUBLICATIONS

A. J. Wilkinson, "MIND: An Inside Look At An Expert System for Electronic Diagnosis", IEEE Design & Test, pp. 69-77, Aug. 1985.
"Expert Systems To Ease Repair of Printed Circuit Boards", IBMTDB, vol. 30, No. 10, Mar. 1988, pp. 314-316.
Anderson, "Error Controls", IBMTDB, vol. 16, No. 6, Nov. 1973, pp. 1901-1902.
Miller, "AI Applications in The Computer/Electronics Industry", SEAI, Tech. Pub., 1988, p. 36.
Conlon, "Diagnostics: Key to Self-Sufficiency", Jun. 30, 1986, pp. 1-4.
Gibson, "NAS Claims AI System Sniffs Out Potential Mainframe Disk Crashes", Computerworld News.
Cynar et al., "Expert Systems Solve Network Problems", Data Communications, May 1986, pp. 187-190.
Ennis et al., "A continuous real-time expert system for computer operations", IBM J. Res. Develop., vol. 30, No. 1, Jan. 1986, pp. 14-27.
Gevarter, "The Nature and Evaluation of Commercial Expert System Building Tools", Computer, May 1987, pp. 24-41.
Taylor et al., "An Expert System for Terminal Fault Diagnosis", Imperial Chemical Industries plc, pp. 213-219, Abstract.
Waterman, "A Guide to Expert Systems," 1985.

*Primary Examiner*—Robert W. Beausoliel
*Attorney, Agent, or Firm*—Fish & Richardson

[57] ABSTRACT

An expert system for determining the likelihood of failure of a unit in a computer system. The operating system of the computer system maintains a log of the errors occurring for each unit in the computer system. If a predetermined number of errors have been entered in the log for a specific unit, the expert system retrieves the error entries relating to that unit and processes them to determine whether a failure is likely to occur. In this, the processing performed by the expert system is arranged so that tests relating to components of increasing particularity, and decreasing generality, are performed after the tests relating to more general components.

20 Claims, 13 Drawing Sheets

30 PERFORM ANALYSIS IN CONNECTION WITH COMMUNICATIONS FAILURE THEORIES

31 ANY COMMUNICATIONS FAILURE THEORIES SATISFIED? — NO

↓ YES

32 GENERATE FAULT THEORY ENTRY FOR STORAGE IN THEORY FILE

33 ACTIVATE NOTIFICATION MODULE AND RECOVER MODULE

34 PERFORM ANALYSIS IN CONNECTION WITH DRIVE-DETECTED NON-MEDIA FAILURE THEORIES

35 ANY DRIVE-DETECTED NON-MEDIA FAILURE THEORIES SATISFIED? — NO

↓ YES

36 GENERATE FAULT THEORY ENTRY FOR STORAGE IN THEORY FILE

37 ACTIVATE NOTIFICATION MODULE AND RECOVER MODULE (A)

COMMUNICATIONS FAILURE ANALYSIS

FIG. 2D-1

TEST 1 - HEAD MATRIX FAILURE TEST

TEST V - READ PATH FAILURE TEST

FIG. 2D-6

TEST VI - BAD HEADS ON OPPOSING SURFACES TEST

FIG. 2D-7

FIG. 2D-8

IDENTIFYING LIKELY FAILURE POINTS IN A DIGITAL DATA PROCESSING SYSTEM

This is a continuation, of application Ser. No. 07/175,485, filed Mar. 30, 1988.

BACKGROUND OF THE INVENTION

1. Field of the Invention

The invention relates generally to the field of digital data processing systems, and more specifically to mechanisms for diagnosing faults and errors in such systems.

2. Description of the Prior Art

Over the past several years, the importance of the availability of computers to government and industry has increased markedly. Computers have been developed and adapted for use not only in fairly conventional activities such as bookkeeping, accounting and inventory control activities but also in more esoteric areas as design, engineering, and manufacturing. Computers have also been adapted for use in many office activities such as document generation using word processing and graphic design. Access to computerized databases, either on-site or over telephone lines, is also important in knowledge-intensive activities.

In attempting to fulfill the ever-increasing demand for both processing power and sharing of information among users, individual computers are being made faster and more complex, and multiple computers are being linked in clusters or networks to facilitate sharing of data and resources, such as telecommunications links, printers, and so forth, among users. As such computer systems increase in complexity, the likelihood of a failure, either in hardware or in software, also increases. A number of strategies have been devised to minimize disruption, as well as service costs, which may occur as a result of a failure. Typically, however, such strategies rely on the occurrence of a failure, which may be manifested by a user noticing a disruption in service or, potentially more disastrous, the loss of data. At that point, a service technician normally attempts to identify the failed component and repair it, which can require several service trips to the computer site and extensive running of diagnostic programs to identify the failed component. Thus, the repair process may be somewhat costly, not only in service charges but also in the fact that the computer is either not available or provides only a degraded level of performance.

SUMMARY OF THE INVENTION

The invention provides a new and improved expert system for use in conjunction with a digital computer system that monitors the operations of the various components of the computer system and identifies when a component is likely to fail, permitting it to be replaced. The expert system thus identifies likely points of failure in the computer system before a failure is noticeable by a user or operator. In addition, the expert system may notify the computer system's operating system of the component likely to fail so that the operating system may take measures to minimize loss of data or degradation of system performance.

In brief summary, the expert system determines the likelihood of failure of a unit in a computer system. The operating system of the computer system maintains a log of the errors occurring for each unit in the computer system. If a predetermine number of errors have been entered in the log for a specific unit, the expert system retrieves the error entries relating to that unit and processes them to determine whether a failure is likely to occur. In this, the processing performed by the expert system is arranged so that tests relating to components of increasing particularity, and decreasing generality, are performed after the tests relating to more general components.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
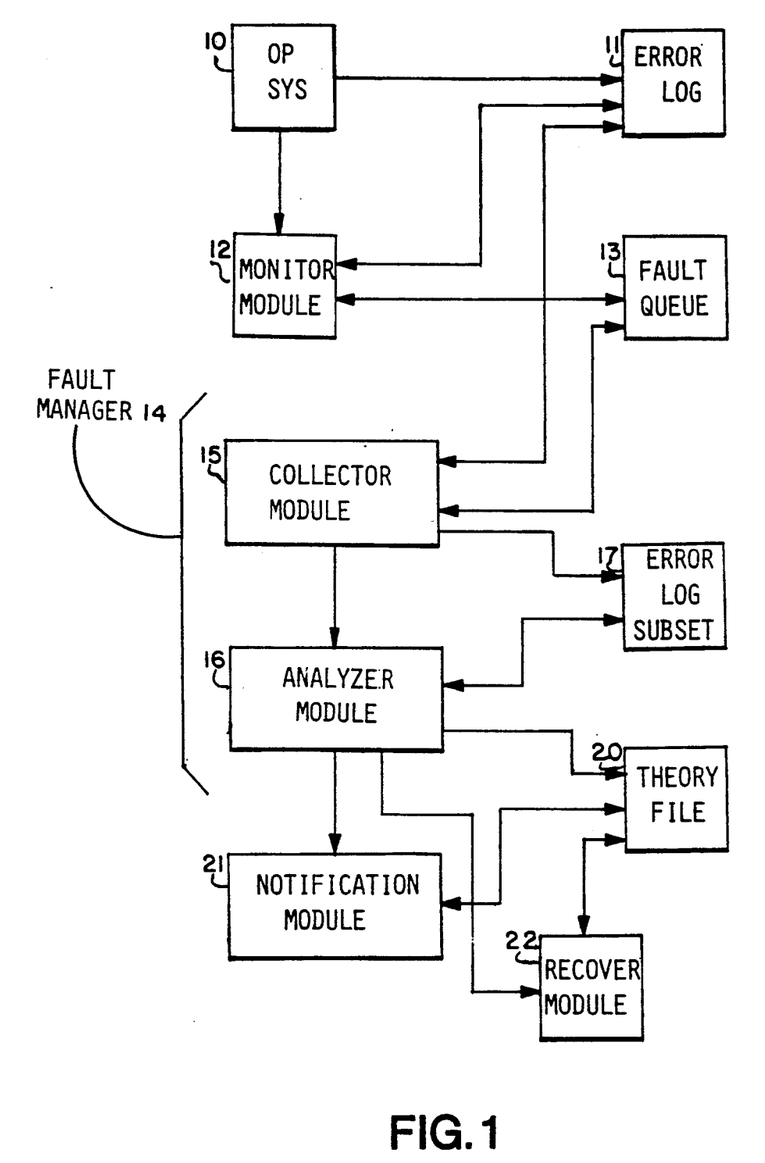
FIG. 1 is a functional block diagram depicting the major components of an expert system constructed in accordance with the invention.

FIG. 1 is a functional block diagram of an expert system for identifying likely failure points in a digital data processing system, that is, a computer system. Preliminarily, it will be appreciated that the expert system may be in the form of a computer program processed by the computer system. Typically, a computer system includes one or more computers. If the computer system includes a plurality of computers, the computers are interconnected by communications links to form clusters or networks to permit the sharing of data and programs among the diverse computers.

Each computer in a computer system comprises a number of units, including one or more processors and memories, and may also include mass storage subsystems, such as disk and/or tape storage systems, as backup and auxiliary storage, and input/output systems such as video display terminals, printers, telecommunications links, and so forth, with all of the units being selectively interconnected by buses. The expert system, which may be run in connection with any of the computers in the network or cluster, and detects likely failures of any of the units included therein. In one specific embodiment, the expert system detects likely failures of one specific type of unit, in particular, a disk storage subsystem, but it will be appreciated that similar expert systems, embodying the invention, may be used to detect likely failures in any type of unit which may be included in the computer system.

With reference to FIG. 1, the expert system includes a plurality of operational elements which communicate fault information, which relates to intermittent or permanent failures in the various units comprising the system, through a plurality of data structures. As is conventional, the computer system's operating system 10, which manages the various hardware and software resources included in the computer system, maintains an error log 11 in which it records indicia pertaining to the various faults, errors, and so forth, arising from the operation of the units in the computer system.

When the operating system 10 stores an item in the error log 11, it also enables a monitor module 12, which forms part of the expert system. The upon being enabled by the operating system 10, the monitor module categorizes the various entries in the error log 11 to determine whether there are enough entries relating to possible failure of any specific unit to justify further analysis, and, if so, generates a record for entry in a fault queue 13. It will be appreciated that the likely failure of a unit, or a component thereof, may be presaged by multiple types of errors, which may or may not be directly attributed to or associated with the unit. For example, an impending failure of a bus interface component of a unit, or of a bus wire itself, may give rise to errors indicated for various units attached to the bus. The attribution of errors to the likelihood of failure of particular units depends upon the particular computer system in which the expert system is being run.

In any event, the monitor module 12, upon being enabled by the operating system 10, categorizes the various entries in the error log 11 to determine whether the errors noted therein are random or transient, or whether they indicate that any particular unit in the computer system is likely to fail. In that operation, the monitor module 12 may associate entries in the error log with particular units thereof and determine whether the number of entries associated with any particular unit exceed a predetermined threshold. If not, the monitor module 12 exits, waiting for the operating system 10 to enable it again.

On the other hand, if the monitor module 12 determines that the number of entries associated with any particular unit exceed a predetermined threshold, the monitor module 12 generates a fault entry and inserts it into a fault queue 13. The fault entry identifies the particular unit and the entries in the error log 11 relating to the unit which prompted generation of the fault entry. In addition, if the fault entry is the first entry in the fault queue 13, the monitor module activates a fault manager 14, which processes fault entries in the fault queue 13.

The fault manager 14 includes two modules, namely, a collector module 15 and an analyzer module 16. When initially activated by the monitor module, the collector module retrieves a fault entry from the fault queue 13, identifies the unit in the computer system which prompted generation of the fault entry and retrieves, from the error log 11, the error entries in the error log 11 associated with the unit. The collector module 15 then creates an error log subset 17, which contains the error entries from the error log 11 associated with the unit, and activates the analyzer module 16.

The analyzer module 16 analyzes the error entries in the error log subset 17 provided by the collector module 15 to determine whether the unit is likely to fail. The analyzer module 16 performs the analysis in connection with various failure theories relating to the unit, as described below in detail in connection with FIGS. 2A through 2D, and determines the likelihood of the unit failing. Briefly, each type of error constitutes evidence of the likelihood of failure of the unit according to one or more failure theories. Each failure theory, in turn, relates to a specific one of a plurality of modes in which the unit may fail, with each failure mode being directed to a particular component in the unit that may fail. Each failure theory requires that a predetermined number of errors relating to the component occur in order for the expert system, and particularly the analyzer module 16, to deem the failure likely to occur.

The analyzer module 16 determines whether the error log subset 17 contains sufficient error entries which are related to any of the various failure theories, and, if so, generates a fault theory entry identifying the unit and the fault theory and stores them in a theory file 20.

After the analyzer module 16 has generated a fault theory entry and stored it in the theory file 20, it activates a notification module 21 and a recover module 22. The notification module queries the theory file 20 and, using the fault theory entries stored therein, generates an operator notification message to notify the system operator of the likelihood of a failure. The operator notification message permits the operator to initiate recovery procedures in connection with the failure indicated thereby. The nodification module 21 also generates a service technician notification message that includes indications of the types of errors which gave rise to the satisfaction of a failure theory and the determination that a failure is likely to occur, which may be used by a service technician during a repair operation.

Upon activation by the analyzer module 16, the recover module 22 also queries the theory file 20 and initiates selected recovery operations which may be indicated in response to the various fault theory entries stored therein. Specifically, in one embodiment in which the expert system is used to determine the likelihood of failures of various disk storage units in a computer system, if a fault theory entry in the theory file 20 indicates that a disk storage unit may be failing, the recover module 22 may enable the operating system to use another disk storage unit as a shadow or backup. In that case, the operating system enables data stored on the failing disk storage unit to also be stored on the other disk storage unit, thereby reducing the likelihood that data will be lost. Furthermore, the data so stored is thus available on the other disk storage unit during the repair operation.

As noted above, the analyzer module 16 analyzes the error entries in the error log subset 17 in connection with a plurality of failure theories to determine whether the unit is likely to fail. If the analyzer module 17 determines that the error entries do not satisfy any of the failure theories, it returns control to the collector module 15, which then processes the next entry in the fault queue 13. The fault manager 14 iteratively processes the entries in the fault queue 13 provided by monitor module 12, until all of the entries have been processed. It will be appreciated that the computer system may run monitor module 12 and the modules comprising the fault manager 14 concurrently, and so the monitor module 12 may load entries in the fault queue 13 concurrently with removal by the fault manager 14, and specifically by the collector module 15, for processing.

As described above, the analyzer module 16 performs analyses using the error entries in the error log subset 17 in connection with a plurality of failure theories. The failure theories are applied in a hierarchical fashion, since errors which may be attributed by the operating system 10 to a plurality of components of the same type in a unit may actually provide evidence of the likely failure of another component.

For example, in a disk storage unit, while a number of errors attributed to a single read/write head may indicate likely failure of that head, random errors attributed to a plurality of read/write heads may indicate likely failure of another component which may be connected to all of those heads, such as circuitry that energizes the heads for writing or that receives the read signals from the heads. To ensure that the other component is the one identified as being likely to fail, rather than all of the heads, the analyzer module 16 performs the analysis in connection with that other component before performing the analyses in connection with the heads.

In one embodiment, the failure theories are divided into three groups, which are identified generally as communications failure theories, drive-detected non-media failure theories, and media failure theories. Generally, the communications failure theories are directed to errors in connection with information received from the drive storage unit, including such errors as indications of failure of the disk storage unit to execute a command within a selected timeout interval, of dropouts of certain signals from the disk storage unit, of parity errors in signals from the disk storage unit, and so forth. The controller in the mass storage subsystem including the disk storage unit may notify the operating system 12 of any such errors in connection with requests for error recovery by means of, for example, interrupt service.

The drive-detected non-media failure theories are generally directed to errors in connection with transmissions of information to the drive storage unit by other units in the computer system. The disk storage unit may notify the operating system 12 of any such errors in connection with requests for error recovery by, for example, interrupt service.

Finally, the media failure theories are generally directed to such errors as may be indicated by timing, head/disk movement or error detection/correction circuitry, which may indicate likelihood of failure of one or more read/write head, the circuitry for energizing the heads, servo circuitry, failures, such as scratches, in the media, and so forth within the disk storage unit, and may also indicate the likelihood of failure of the error detection/correction circuitry itself.

Figure 2A:
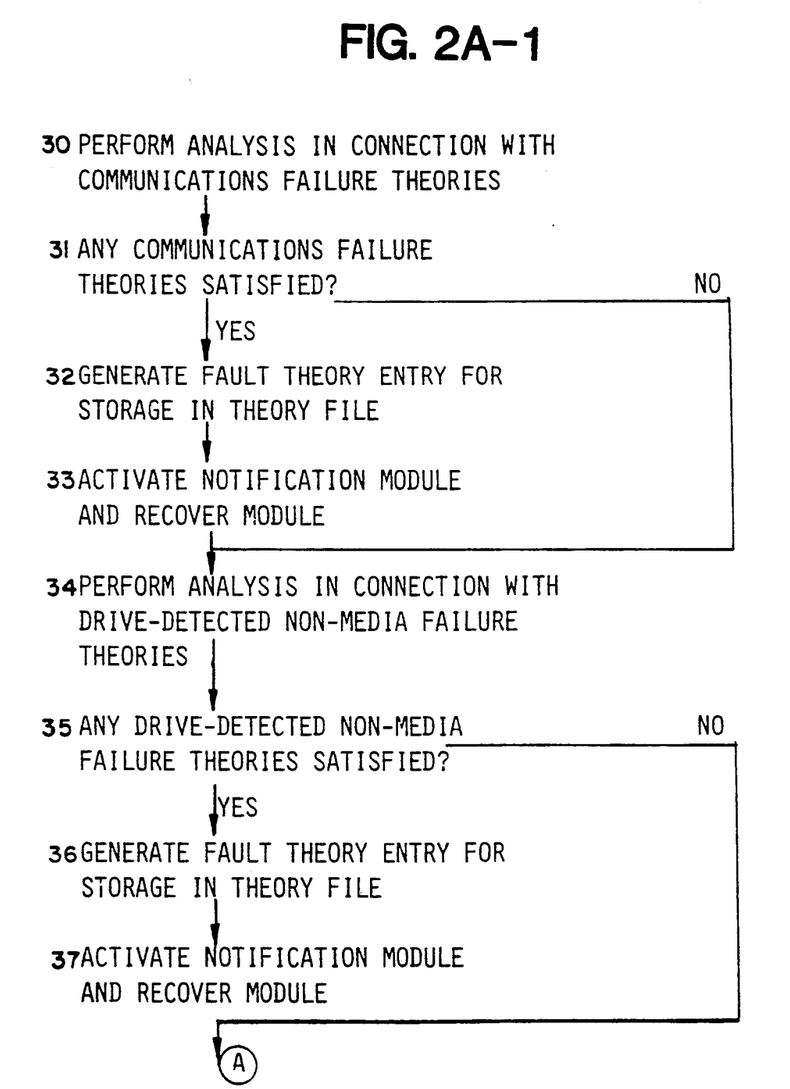
FIGS. 2A through 2D depict flow diagrams detailing failure analyses performed by the expert system depicted in FIG. 1.
Figure 2A:
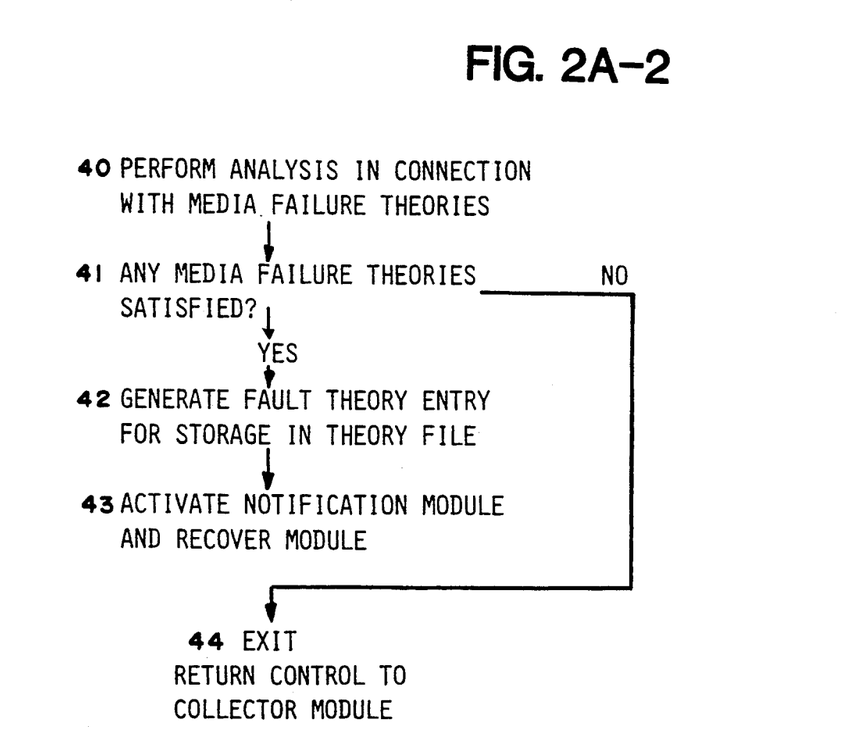

With this background, the general operations performed by one embodiment of the analysis module 16 in connection with the error entries in the error log subset 17 are depicted in FIGS. 2A-1 and 2A-2. It will be appreciated that the specific operations performed will be based on the specific units, and their components, with which the expert system (FIG. 1) is to be used. With reference to FIG. 2A-1, the analysis module 16 first performs an analysis operation in connection with the communications failure theories (step 30). The analysis operation performed in step 30 is described below in connection with FIG. 2B. If the analysis module 16 determines that a communications failure theory is satisfied (step 31) it generates a fault theory entry and stores it in the theory file 20 (step 32). The analysis module 16 thereafter activates the notification module 21 to generate an appropriate message for the operator and the recover module 22 to take suitable recovery operations (step 33).

If, in step 31, the analysis module 16 determines that the error indications do not satisfy a communications failure theory, the analysis module sequences to step 34, in which it performs an analysis operation in connection with the drive-detected non-media failure theories. The analysis operation performed in step 34 is described below in connection with FIG. 2C. If the analysis module 16 determines that a drive-detected non-media failure theory is satisfied (step 35) it generates a fault theory entry and stores it in the theory file 20 (step 36). The analysis module 16 thereafter activates the notification module 21 to generate an appropriate message for the operator and the recover module 22 to take suitable recovery operations (step 37).

On the other hand, if, in step 35, the analysis module 16 determines that the error indications do not satisfy a drive-detected non-media failure theory, the analysis module sequences to step 40, in which it performs an analysis operation in connection with the media failure theories. The analysis operation performed in step 34 is described below in connection with FIG. 2D. If the analysis module 16 determines that a media failure theory is satisfied (step 41) it generates a fault theory entry and stores it in the theory file 20 (step 42). The analysis module 16 thereafter activates the notification module 21 to generate an appropriate message for the operator and the recover module 22 to take suitable recovery operations (step 43).

Figure 2B:
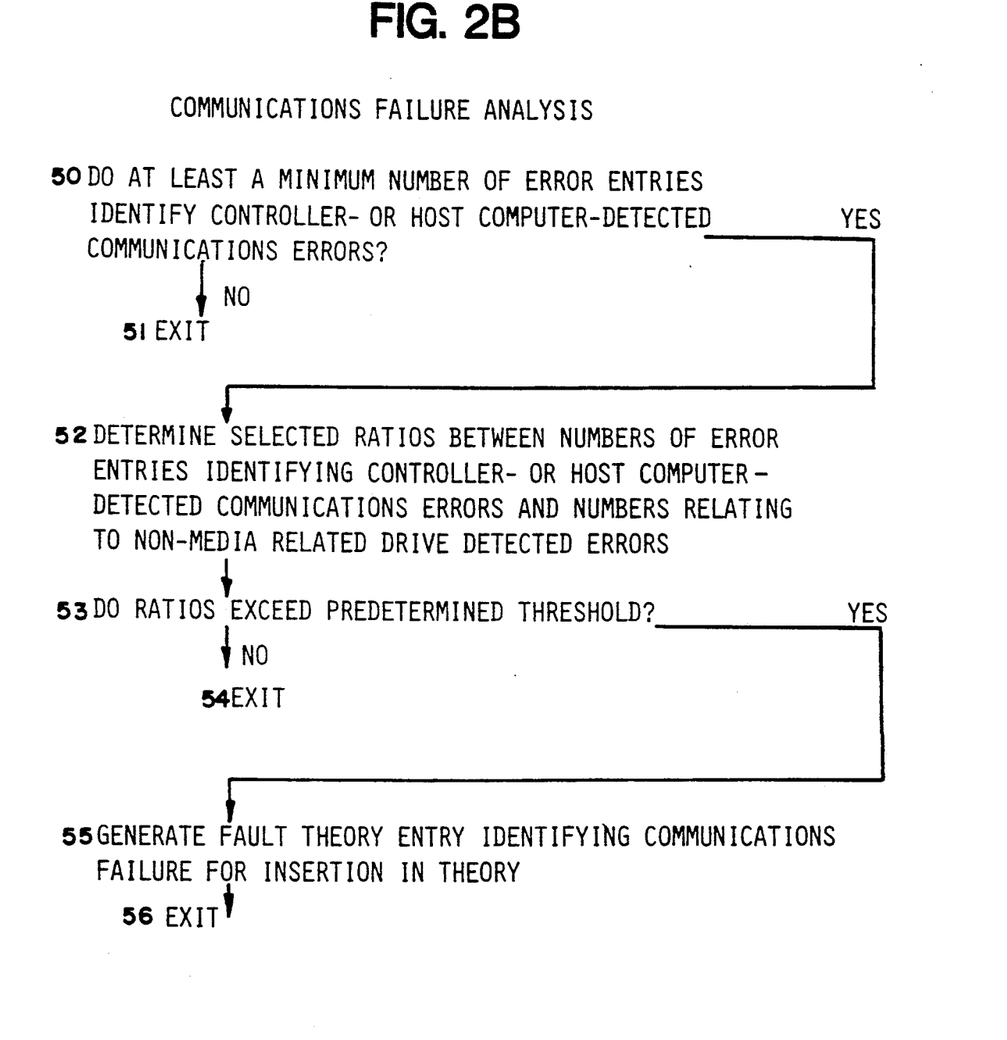

Finally, if, in step 41, the analysis module 16 determines that the error indications do not satisfy a media failure theory, the analysis module sequences to step 44, in which it exits and returns control to the collector module 15. The collector module 15 may then process the next fault entry from the monitor module 12 in the fault queue 13. As described above, if the fault queue 13 is empty, the collector module 15 terminates operation, pending reactivation by the monitor module 12.

As noted above, the operations performed by the analysis module 16 in connection with the communications failure theories are described in connection with FIG. 2B. Such theories relate to errors detected by the host computer or the controller controlling the disk storage unit, such as command timeouts, errors in transmission of certain signals, parity or protocol errors in transmissions, and the like. With reference to FIG. 2B, the analyzer module 16 determines whether at least a predetermined number of the error entries in the error log subset 17 relate to communications errors as detected by controller controlling the disk storage unit or by the host computer (step 50). If there are insufficient numbers of such error entries, the analyzer module 16 exits the communications failure analysis (step 51).

If, on the other hand, the analyzer module 16 determines that the error log subset 17 contains sufficient numbers of such error entries, it sequences to step 52 to provide various ratios relating to error entries relating to the communications errors and non-media drive detected errors (step 52). Since errors giving rise to error entries identifying communications entries may also give rise error entries identifying to non-media drive detected errors, the ratios provided in step 52 assist in determining which is the cause of the errors. If the ratios do not indicate that the errors are due to communications failure (step 53), the analyzer module 16 exits (step 54).

If, on the other hand, the analyzer module 16 in step 53 determines that the ratios do indicate that the errors are due to communications failure, it generates a fault theory entry so indicating for insertion into the theory file 20 (step 55) and exits (step 56).

Figure 2C:
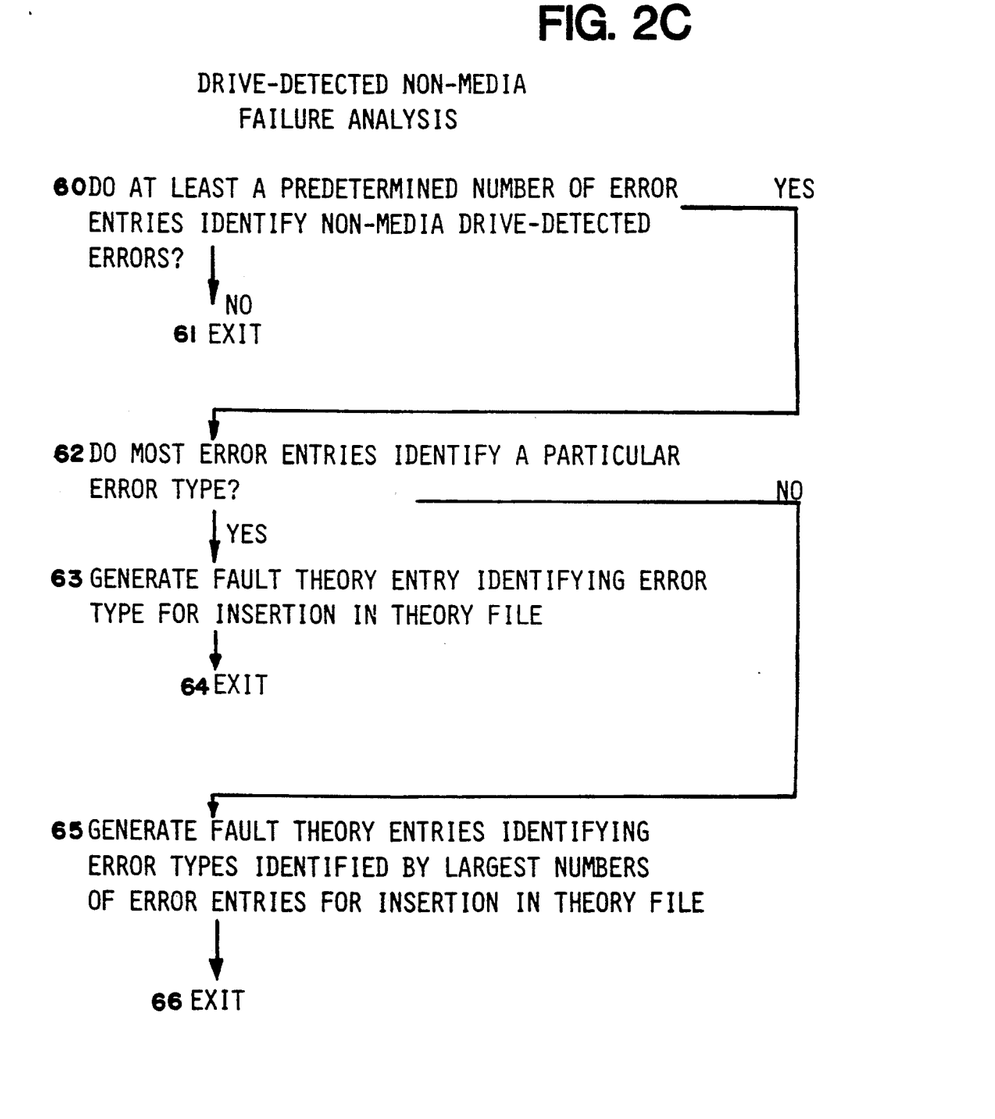

If the analyzer module 16 exits in either steps 51 or 53, it sequences to perform the analysis relating to drive detected non-media failure theories (step 34, FIG. 2A-1), which is depicted in FIG. 2C. Such theories relate to errors detected by the disk storage unit, such as errors in transmission of certain signals, parity or protocol errors in transmissions, and the like. With reference to FIG. 2C, the analyzer module 16 initially determines whether the error log subset 17 contains a threshold number of error entries which relate to non-media drive-detected errors. If the error log subset 17 does not contain the threshold number of such error entries, the analyzer module 16 sequences to step 61, in which it exits.

On the other hand, if, in step 60, the analyzer module 16 determines that the error log subset 17 does contain the threshold number of such error entries, it then determines whether most relate to a particular type of error (step 62), and, if so, it generates a fault theory entry identifying the error type for insertion in the theory file 20 (step 63) and then exits (step 64). If no single error type predominates among the error entries identifying the non-media drive detected errors, the analyzer module 16 generates one or more fault theory entries identifying the error types identified by the largest number of error entries for storage in the theory file 20 (step 65). Following step 65, the analyzer module 16 exits (step 66).

If the analyzer module 16 exits in step 61, it sequences to perform analysis relating to media-related failure theories (step 40, FIG. 2A-2), which are exemplified in FIGS. 2D-1 through 2D-8. In brief, the media-related failure theories relate to two general classes of errors. One class, namely, random errors, generally includes detection of invalid headers, loss of data synchronization, correctable or uncorrectable data errors detected by error detection and correction circuitry, and so forth. The section class of media related failure theories, namely, drive-detected errors generally related to the drive circuitry or other hardware problems, includes seek errors, off track errors, and errors due to problems with read and write circuitry, including the heads, the servo system, and so forth.

FIGS. 2D-1 through 2D-8 depict a series of eight illustrative tests which the analyzer module 16 performs seriatim. The tests are ordered hierarchically so that later tests are addressed to likelihood of failure of components of increasing particularity, since, as noted above, errors which may be attributed by the operating system 10 to a plurality of more particular components of the same type in a unit may actually provide evidence of the likely failure of another component of more general applicability. Thus, the analyzer module 16 performs a test to determine likelihood of failure of a head matrix, as shown in FIG. 2D-1, before it performs a test to determine likelihood of failure of a single head, as shown in FIG. 2D-8, since a head matrix is a component that relates to a plurality of heads. If the analyzer module 16 were to perform the head failure test prior to performing the head matrix test, it would likely terminate testing on determining that the single head was likely to fail, and never reach the head matrix test. It will be appreciated that, if one test is satisfied, that is, if the analyzer module 16 determines from a test in one of FIGS. 2D-1 through 2D-8 that a failure is likely, it does not progress to the subsequent tests.

The sequences of operations depicted in FIGS. 2D-1 through 2D-8 are generally self-explanatory, and will not be described in detail. In each test, the analyzer module 16 performs a predetermined series of operations in connection with error entries in the error log subset 17. If criteria set forth in a test are satisfied, it generates a fault theory entry identifying the likely failure and inserts it into the theory file 20. Otherwise, the analyzer module 16 steps to the next test, or, in the case of the last test, exits and returns control to the collector module 15.

Figure 2D:
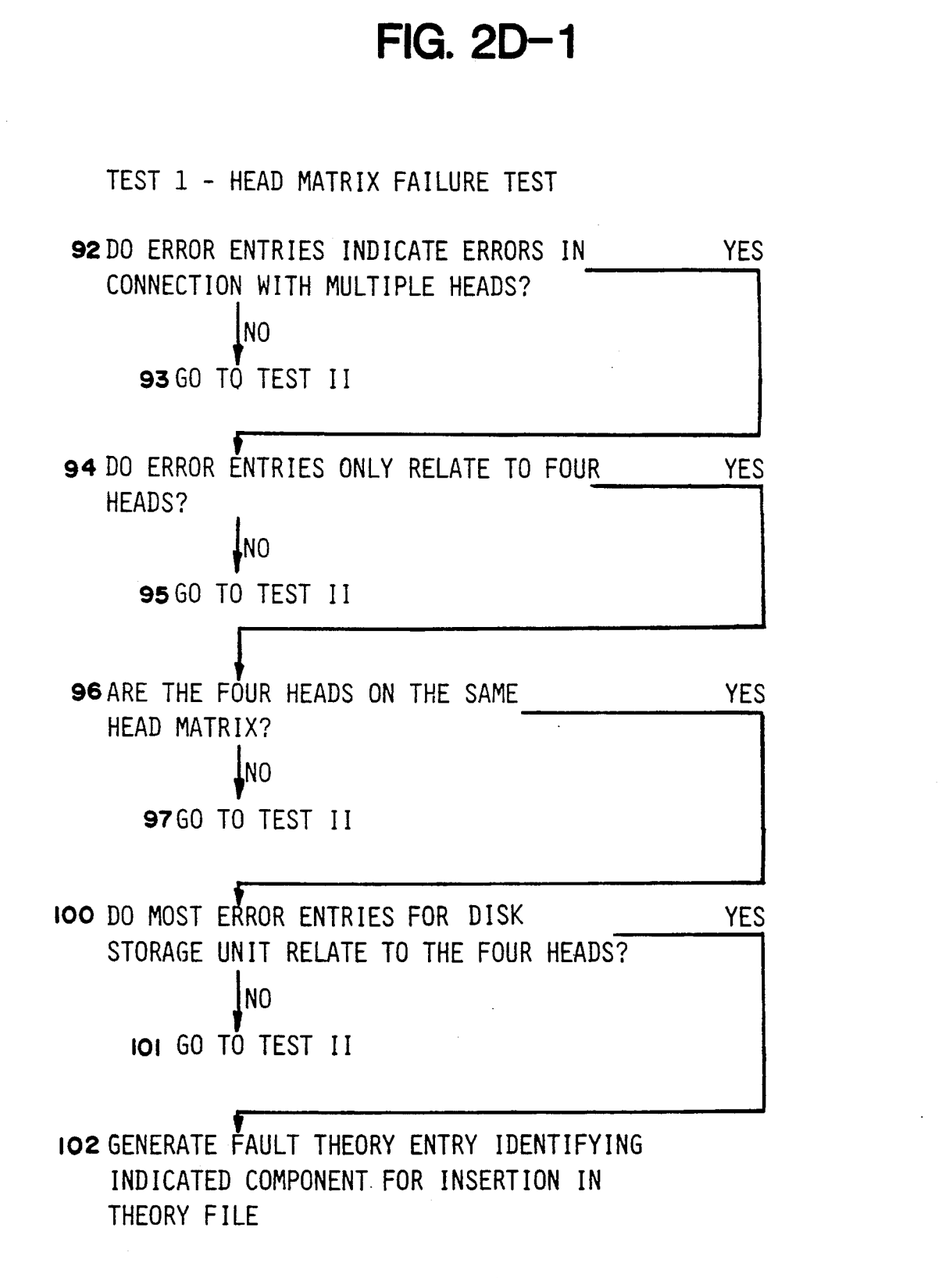
Figure 2D:
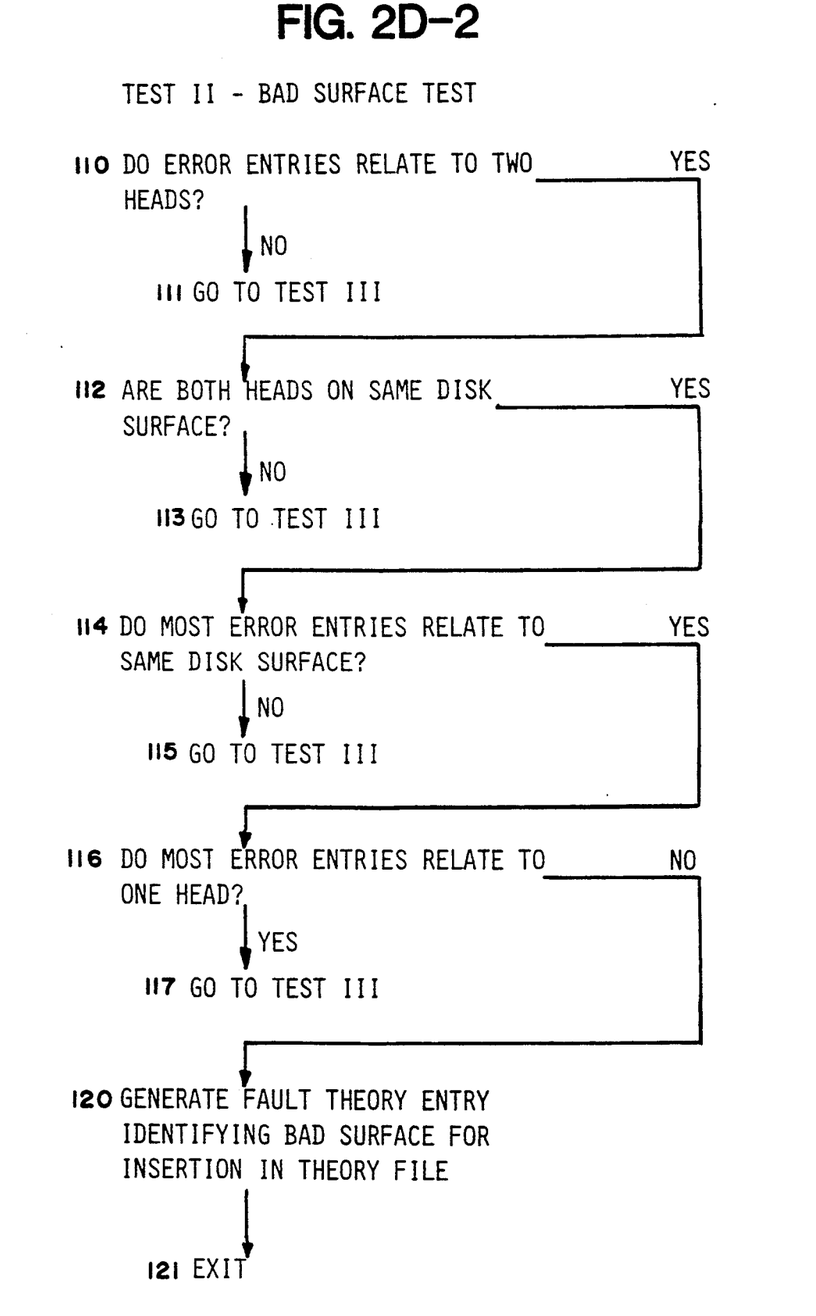
Figure 2D:
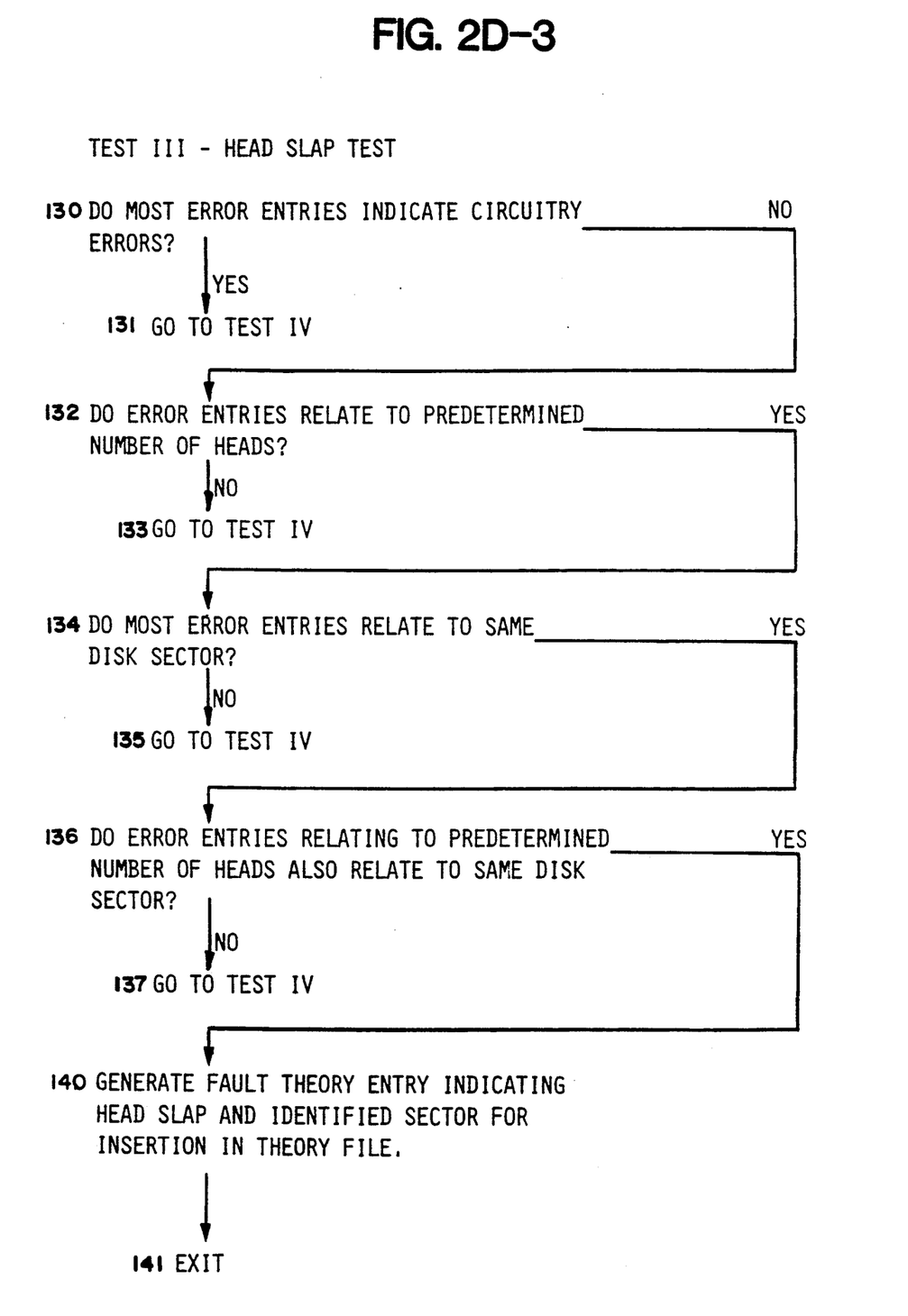
Figures 2D, 4A:
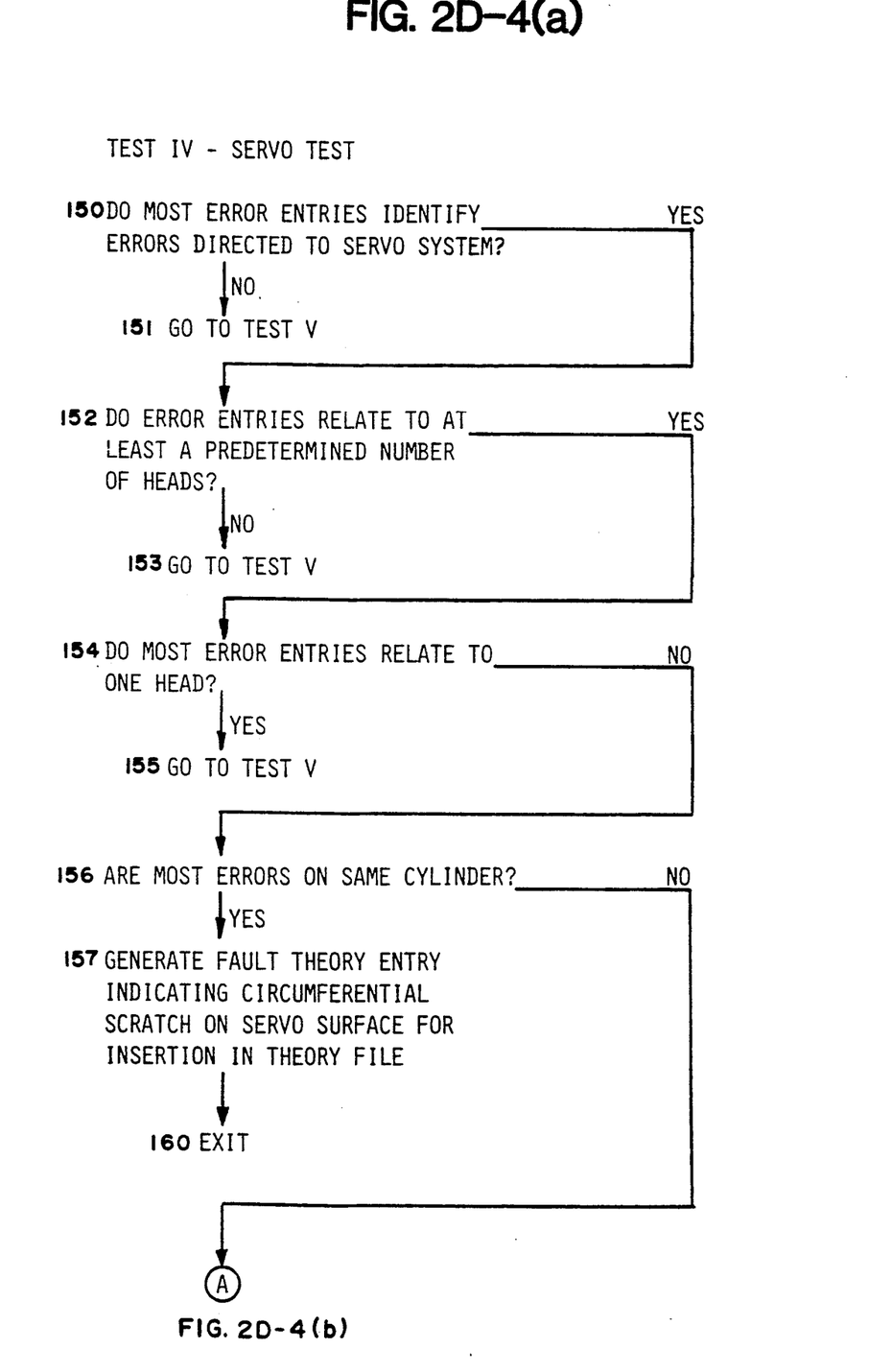
Figures 2D, 4B:
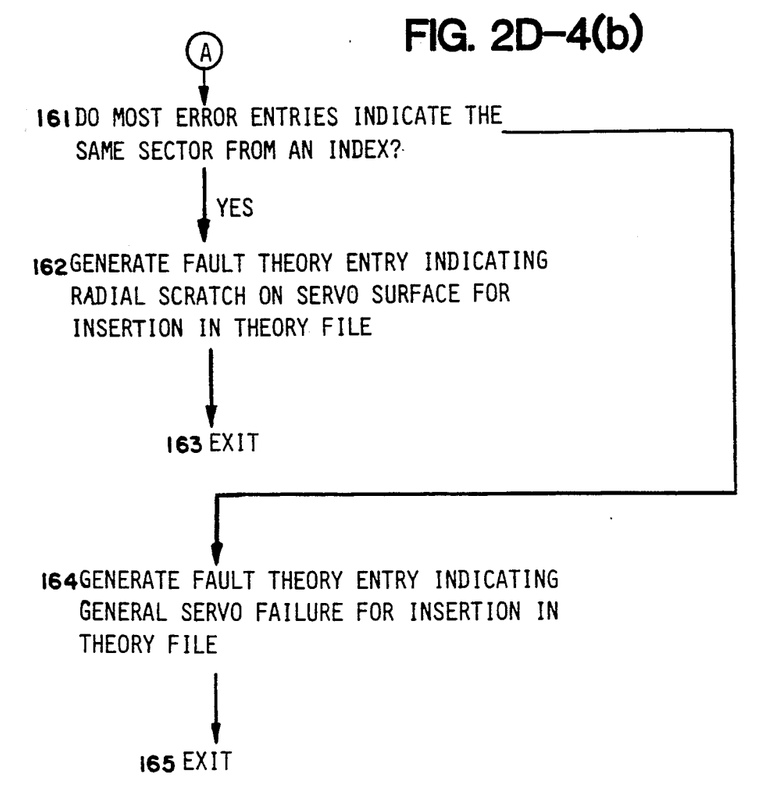

Generally, in the head matrix failure test depicted in FIG. 2D-1, since a head matrix relates to the operation of a four read/write heads, the analyzer module 16 performs a series of steps, first, to determine whether the error log subset 17 contains error entries that relate to more than one head (step 92), and, second, to determine whether most of the error entries relate to heads related to a specific head matrix (steps, 94, 96 and 100). If so, it generates a fault theory entry for storage in the theory file 20 that identifies the head matrix as being likely to fail (step 102).

If the analyzer module 16 determines, in the sequence depicted in FIG. 2D-1, that the head matrix failure is unlikely, it initiates a test, as depicted in FIG. 2D-2, to determine the likelihood of a bad disk surface, that is, a generally bad storage medium. This test requires errors generally evenly distributed among read/write heads that operate in connection with the disk surface.

If the analyzer module 16 determines that a bad disk surface is not indicated, in the sequence depicted in FIG. 2D-2, it steps to the sequence depicted in FIG. 2D-3 to perform a test to determine the likelihood of one sector of the disk being bad, which generally occurs as a result of a "head slap", that is, a head striking the disk generally resulting in a defect in one sector. In a disk storage unit having multiple read/write heads for each disk surface, the analyzer module 16 determines whether at least a predetermined threshold number of error entries in the error log subset 17 are identify at least some of the heads on the same disk surface and identify an error occurring in the same sector.

If the analyzer module 17 determines that a "head slap" is note indicated, in the sequence depicted in FIG. 2D-3, it steps to the sequence depicted in FIGS. 2D-4(a) and 2D-4(b) to determine the likelihood of failure of the disk storage unit's servo system. In that sequence, the analyzer module 16 first determines that error entries identify servo errors and that they relate to multiple heads in the disk storage unit. The analyzer module 16 then determines the likelihood of a circumferential scratch (step 156) or radial scratch (step 161) on the servo surface of the disk. If the analyzer module 16 determines that neither a circumferential nor a radial scratch is likely, it determines that a general servo failure is likely.

Figure 2D:
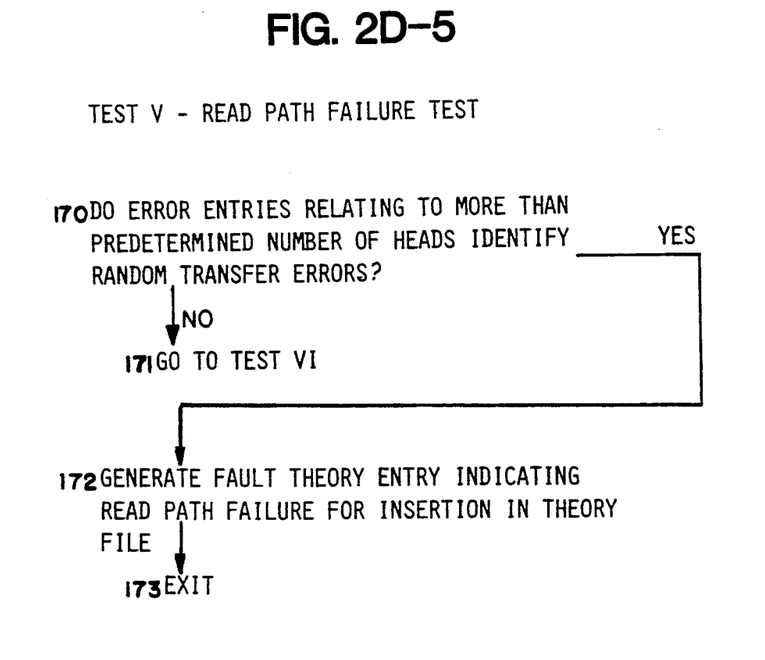
Figure 2D:
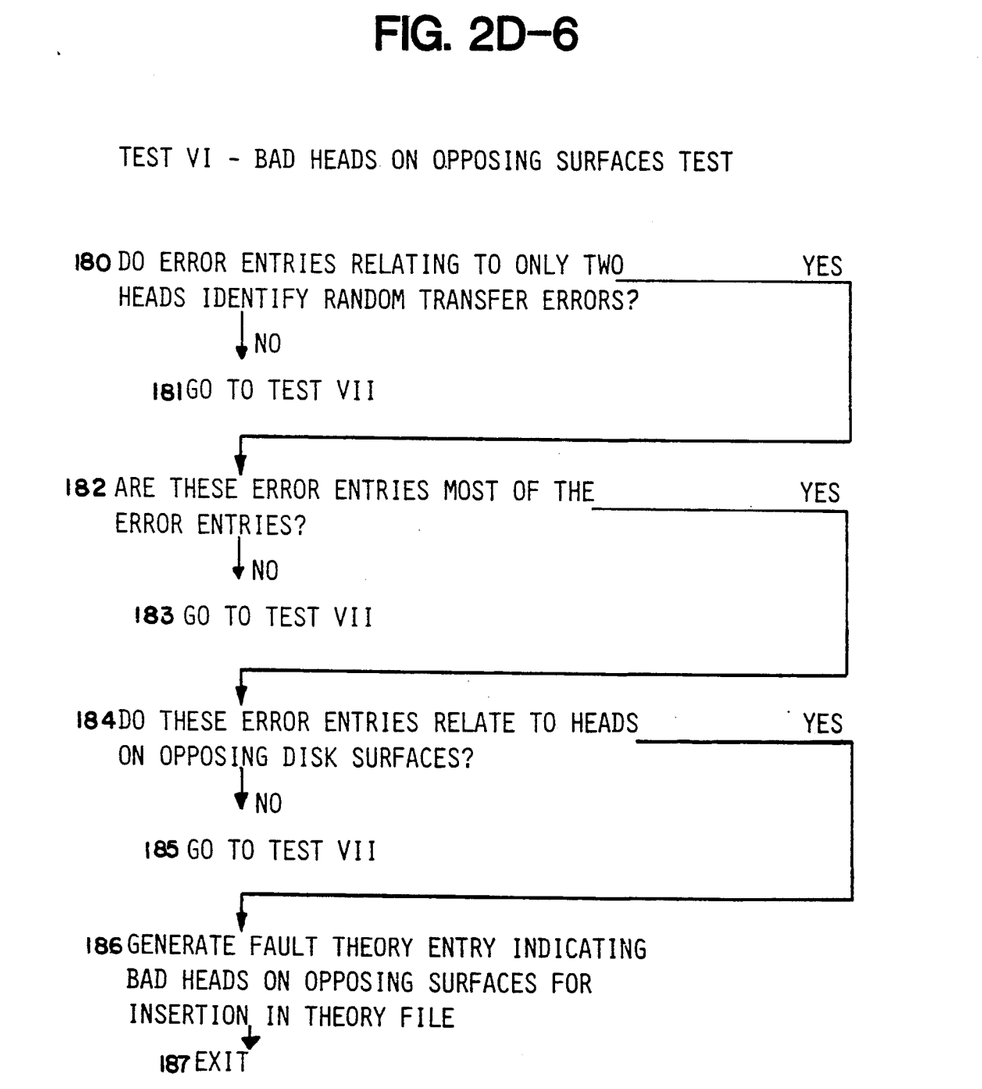
Figure 2D:
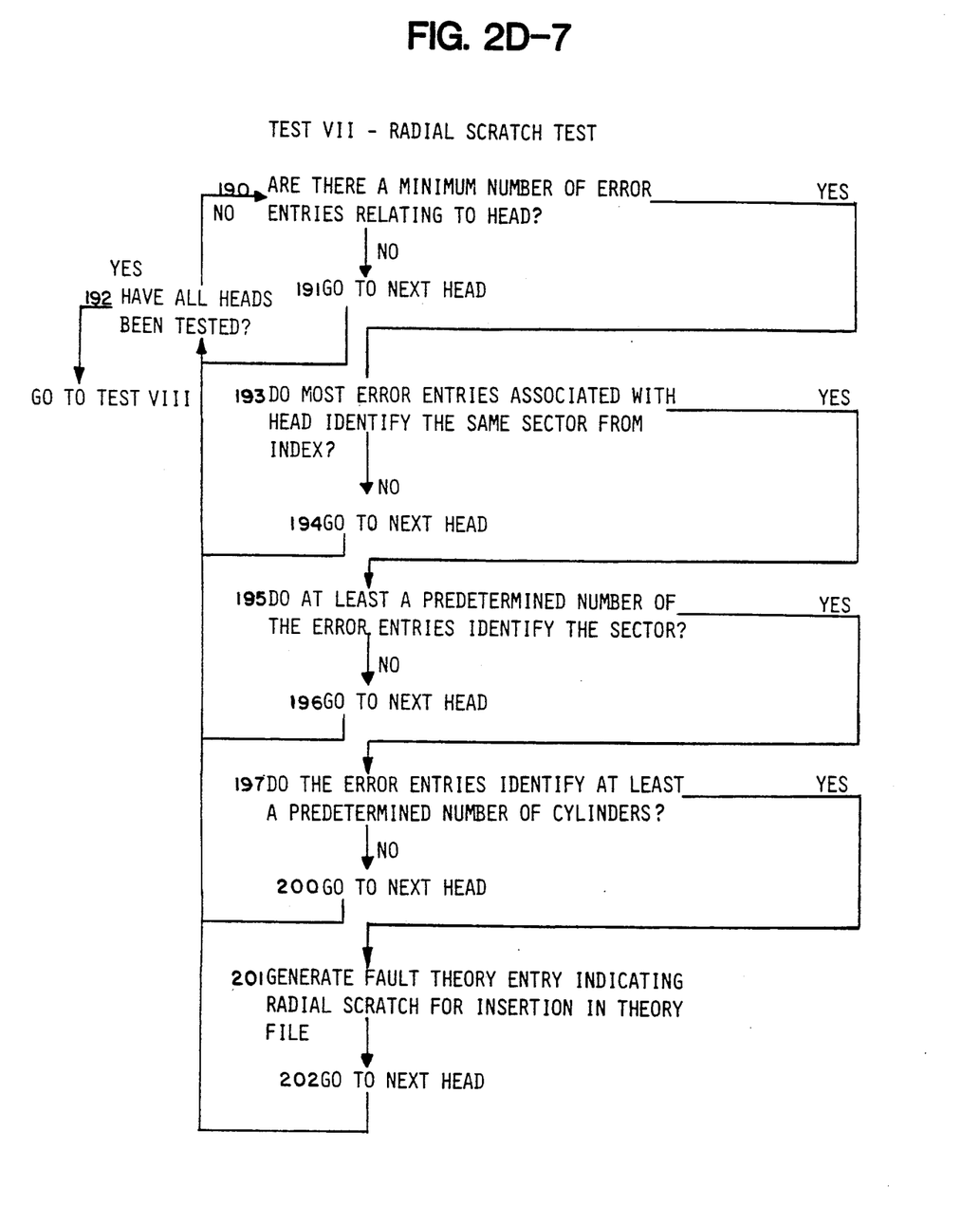
Figure 2D:
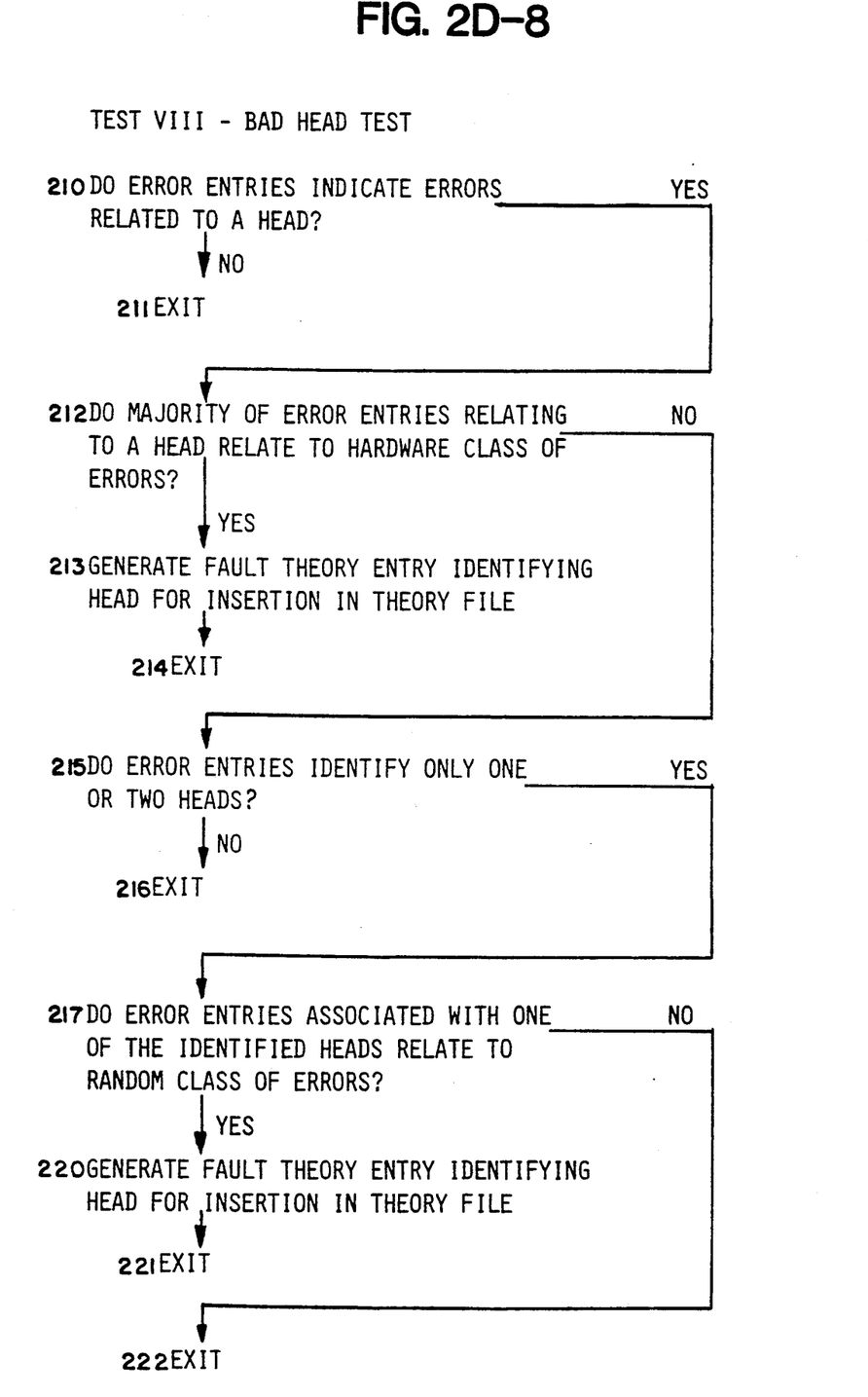

Thereafter, the analyzer module 16 performs a read path failure test (FIG. 2D-5) to determine the likelihood of a general read path failure. If a predetermined number of error entries identify random errors, indicating detection of invalid headers, loss of data synchronization, correctable or uncorrectable data errors detected by error detection and correction circuitry, and so forth, the analyzer module 16 determines that a general read path failure is likely.

Three additional tests are depicted in the Figs. Following the read path failure test (FIG. 2D-5), the analyzer module 16 performs a test to determine whether heads on opposing, that is, facing, disk surfaces are likely to fail (FIG. 2D-6), to determine whether a radial scratch is present on a disk surface (FIG. 2D-7), and a test to indicate whether a specific read/write head is likely to fail (FIG. 2D-8). In the test depicted in FIG. 2D-7, the test is iteratively performed in connection with each of the heads in the disk storage unit.

It will be appreciated that the specific tests, and the order in which they are performed, in connection with the expert system are determined by the specific units in connection with which the expert system (FIG. 1) is to be used. If the expert system is to be used in connection with the controller of the disk storage unit, as well as the disk storage unit itself, the expert system will be required to perform additional tests directed to the controller prior to the performing the tests directed to the disk storage unit. Similarly, if the expert system is used in connection with a clustered or networked computer system comprising a plurality of computers which communicate over one or more communications link, the expert system may be run on one computer in the digital data processing system and may, with suitable additions to detect errors in a processor, memory, and other types of components of a computer, be used to detect the likelihood of failures occurring in other computers in the computer system.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A method of detecting one of a plurality of likely failures of components in a digital data processing system, comprising the steps of storing a plurality of error entries, each error entry containing a plurality of indicia pertaining to an error event in said digital data processing system, analyzing, through use of a digital data processing system, said error entries containing indicia pertaining to error events, to identify a pattern of differing indicia pertaining to said error events that corresponds with one of a plurality of failure theories, and, based on said failure theory, identifying a said likely failure of a said component and initiating recovery operations to avoid loss of data.

2. A method in accordance with claim 1, wherein said step of initiating recovery operations comprises enabling an operating system to use a substitute disk storage unit as a backup for a likely-to-fail disk storage unit.

3. A method in accordance with claim 1, wherein said step of initiating recovery operations comprises substituting a redundant component for a likely-to-fail component.

4. A method in accordance with claim 1, wherein said step of initiating recovery operations comprises transferring data from a likely-to-fail component to a substitute component.

5. A method in accordance with claim 1, wherein said step of initiating recovery operations comprises reconfiguring of redundant components in a manner such that said digital data processing system is serviced without interruption of operations and without loss of data.

6. A method in accordance with claim 5, wherein said step of initiating recovery operations is embedded in software that automatically notifies a maintenance utility that service is required.

7. A method in accordance with claim 6, wherein said software identifies a likely-to-fail component to said maintenance utility.

8. A method in accordance with claim 1, wherein said step of identifying a likely failure of a component comprises predicting failure of a component before said component actually fails.

9. A method in accordance with claim 1, wherein said step of identifying a likely failure of a component comprises detecting an actual failure of a component.

10. A method in accordance with claim 1, wherein said digital data processing system that analyzes said error entries is said digital data processing system in which likely failures are detected.

11. A system for detecting one of a plurality of likely failures of components in a digital data processing system, comprising a collector module means for collecting a plurality of stored error entries, each error entry containing a plurality of indicia pertaining to an error event in said digital data processing system, an analyzer module means for analyzing said error entries containing indicia pertaining to error events, identifying a pattern of differing indicia pertaining to said error events that corresponds with one of a plurality of failure theories, and, based on said failure theory, identifying a said likely failure of a said component, and a recovery module means for initiating recovery operations, based on said failure theory, to avoid loss of data, said collector module means, said analyzer module means, and said recovery module means being adapted for implementation by a digital data processing system.

12. A system in accordance with claim 11, wherein said recovery module means enables an operating system to use a substitute disk storage unit as a backup for a likely-to-fail disk storage unit.

13. A system in accordance with claim 11, wherein said recovery module means substitutes a redundant component for a likely-to-fail component.

14. A system in accordance with claim 11, wherein said recovery module means transfers data from a likely-to-fail component to a substitute component.

15. A system in accordance with claim 11, wherein said recovery module means reconfigures redundant components in a manner such that said digital data processing system is serviced without interruption of operations and without loss of data.

16. A system in accordance with claim 15, wherein said recovery module means comprises software that automatically notifies a maintenance utility that service is required.

17. A system in accordance with claim 16, wherein said software identifies a likely-to-fail component to said maintenance utility.

18. A system in accordance with claim 11, wherein said analyzer module means predicts failure of a component before said component actually fails.

19. A system in accordance with claim 11, wherein said analyzer module means detects an actual failure of a component.

20. A system in accordance with claim 1, wherein said digital data processing system that implements said collector module means, said analyzer module means, and said recovery module means is said digital data processing system in which likely failures are detected.

* * * * *

UNITED STATES PATENT AND TRADEMARK OFFICE
CERTIFICATE OF CORRECTION

PATENT NO. : 5,090,014

DATED : February 18, 1992

INVENTOR(S) : Polich et al.

It is certified that error appears in the above-identified patent and that said Letters Patent is hereby corrected as shown below:

Col. 1, line 67, "predetermine" should be --predetermined--.

Col. 2, line 44, delete "and".
       line 65, delete "The" and make "upon" --Upon--.

Col. 5, line 28, "head" should be --heads--.

Col. 6, line 43, insert --to-- after "rise", delete "to" before "non-media".

Col. 7, line 66, delete "a".

Col. 8, line 24, delete "are".
       line 28, "note" should be --not--.
       line 68, delete "the" after "to".

Col. 10, line 59, "claim 1" should be --claim 11--.

Signed and Sealed this

Tenth Day of August, 1993

Attest:

MICHAEL K. KIRK

Attesting Officer

Acting Commissioner of Patents and Trademarks